United States Patent [19]
Lambert

[11] Patent Number: 5,598,072
[45] Date of Patent: Jan. 28, 1997

[54] REGENERATIVE BRAKING CIRCUIT UTILIZING SEPARATELY EXCITED MOTOR

[75] Inventor: Joe C. Lambert, Mebane, N.C.

[73] Assignee: General Electric Company, Fort Wayne, Ind.

[21] Appl. No.: 416,271

[22] Filed: Apr. 4, 1995

[51] Int. Cl.$^6$ .................................................. H02P 3/14
[52] U.S. Cl. ........................ 318/376; 318/139; 318/300; 318/519; 318/536
[58] Field of Search ....................... 318/244, 245, 318/280, 296, 300, 362, 375, 376, 139, 503, 505, 506, 507, 519, 521, 536

[56] References Cited

U.S. PATENT DOCUMENTS

| | | | |
|---|---|---|---|
| 4,375,603 | 3/1983 | Konrad | 318/139 |
| 4,422,021 | 12/1983 | Schwarz | 318/376 |
| 4,730,151 | 3/1988 | Florey et al. | 318/376 |
| 5,039,924 | 8/1991 | Avitan | 318/376 |
| 5,070,283 | 12/1991 | Avitan | 318/139 |
| 5,332,954 | 7/1994 | Lankin | 318/139 |
| 5,489,828 | 2/1996 | Palleggi | 318/139 |

FOREIGN PATENT DOCUMENTS 1603933  5/1978  United Kingdom.

OTHER PUBLICATIONS

WPI Abstract Accession No. 001463398 & DE2538754A (LUCAS) Mar. 11, 1976.

*Primary Examiner*—Bentsu Ro
*Attorney, Agent, or Firm*—Ralph E. Krisher, Jr.

[57] ABSTRACT

A separately excited DC motor system is arranged to provide operation in a smooth, continuous electrical retarding mode. A series contactor connects the motor armature to a DC power source and is controlled so as to immediately open upon sensing of a need for electrical braking. Concurrently, power to the motor field is reversed so that no additional changes are required to brake to zero speed. Field current is modulated to control armature current so as to control braking effort. When speed falls below a value necessary to maintain armature voltage above battery voltage, the armature is cyclically short-circuited to boost armature current so that when the short-circuit is removed, the armature reactance forces current to continue for regeneration.

6 Claims, 1 Drawing Sheet

REGENERATIVE BRAKING CIRCUIT UTILIZING SEPARATELY EXCITED MOTOR

BACKGROUND OF THE INVENTION

The present invention relates to electric motor powered vehicles and, more particularly, to a power control system and method of operation of such control system using a separately excited DC electric motor for propulsion and electrical retarding of the vehicle.

Battery powered electrically powered vehicles, such as fork-lift trucks, which generally operate at low speeds and require development of relatively large torque have historically used series wound direct current (DC) motors for propulsion since such motors exhibit the speed/torque characteristics for moving heavy materials. However, the characteristics of series wound motors are not as desirable for other types of vehicles such as golf carts or on-road vehicles where higher top end speed is desirable at the sacrifice of torque. These latter vehicles have generally adopted shunt wound or separately excited DC motors for their propulsion systems to obtain higher operating speeds. More recently, the availability of microcomputer controllers coupled with high speed, low cost switching devices have enabled the development of separately excited motor control systems which enable the shunt motor to deliver high torque at low speed and still have the high speed advantage of the shunt motor.

Whenever an electric motor is used in a battery powered vehicle, it is desirable to implement regenerative electrical retarding of the vehicle so that energy from the motor can be used to recharge the on-board batteries. With a series wound motor, electrical retarding generally only involves changing one switch to reverse the motor field. With a separately excited motor, control of field current is still required during braking with a transition to field reversal required when motor speed falls below the speed necessary to maintain regenerative current. This transition during the braking interval results in a momentary loss of braking torque which can be felt by the vehicle operator. If the system is used in a fork-lift truck carrying a heavy, unbalanced load, the momentary torque loss may cause the load to sway or fall. While one solution to this problem is to add a switch in parallel with the motor armature, this solution has the drawbacks of considerable cost, reduced reliability of the system and generation of high switching voltages which can detrimentally effect other components of the system.

SUMMARY OF THE INVENTION

Among the several objects of the present invention may be noted the provision of an improved control system in an electrical retarding mode for a separately excited DC motor and the provision of an electrical retarding system for a separately excited DC motor which allows regenerative electrical retarding to essentially zero speed.

In one form, the present invention is illustrated as a method of regenerative electrical retarding of an electrically propelled vehicle in which the vehicle includes at least one separately excited direct current electric traction motor coupled in driving relationship with at least one wheel of the vehicle. The motor has an armature winding coupled via one terminal through a first switch to a relatively positive terminal of a DC power source and has a second terminal connected through a second switch to a relatively negative terminal of a DC power source. The motor further includes a field winding coupled via an H-bridge switch mechanism to the DC power source. In the operation of the system, a commanded change in an operating mode of the vehicle from a propulsion mode to a non-propulsion mode is sensed and in response to the sensed change, the first switch is opened to disconnect the first motor terminal from the DC power source positive terminal. Concurrently, the H-bridge switch mechanism is operated to reverse the connection of the field winding of the motor to the DC power source for reversing the field flux developed in the motor so that the motor armature is effectively connected into a regenerative braking configuration whereby electric current is produced in the armature in a direction to recharge the on-board battery system by continued rotation of the armature caused by rotation of the at least one wheel from continued motion of the vehicle. As the vehicle slows to a point at which the voltage developed by the armature operating in the regenerative mode falls below the voltage of the DC power source, the second switch is then repetitively operated to short circuit the armature through a regenerative braking diode so that current is allowed to build up in the armature winding and then forced into the battery by opening the second switch. By cyclical operation of the second switch, the motor can be operated in a regenerative braking or retarding mode to essentially zero speed of the vehicle.

BRIEF DESCRIPTION OF THE DRAWINGS

For a better understanding of the present invention, reference may be had to the following detailed description taken in conjunction with the accompanying drawing in which.

DETAILED DESCRIPTION OF THE INVENTION

Figure 1:
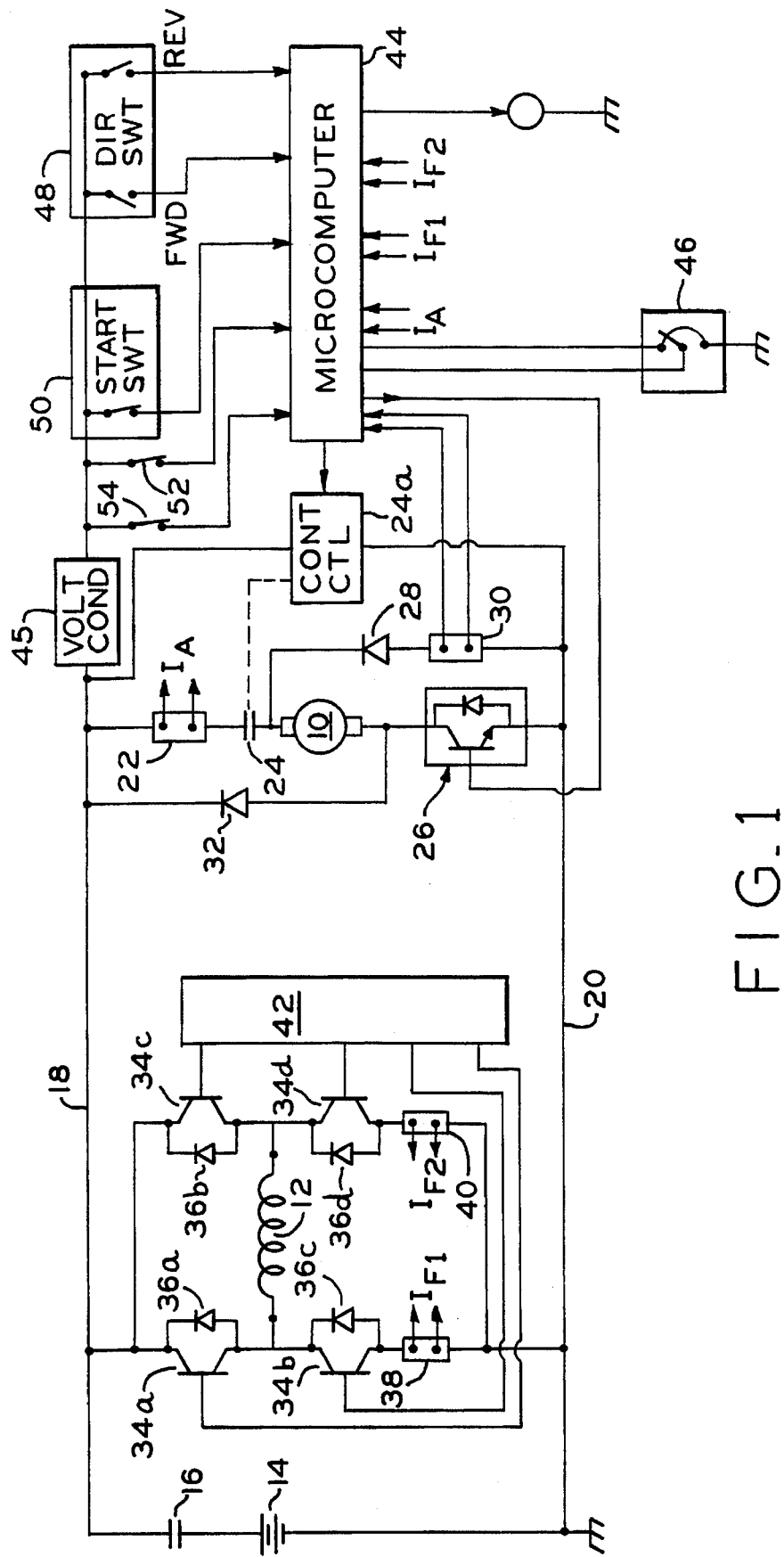
FIG. 1 is a simplified schematic representation of a battery powered electric vehicle control system in accordance with the present invention.

In the illustration, a DC electric traction motor is represented schematically by the armature 10 and field 12. A battery 14 is connected through a contactor 16 to a relatively positive voltage bus 18 and a relatively negative voltage bus 20. Relatively positive voltage power is supplied to a first terminal of the armature 10 from the bus 18 through an armature current sensor 22 and a series connected regenerative braking contactor 24. A second terminal of the armature 10 is connected through a controllable switching device 26 to the negative voltage bus 20. The upper terminal of motor armature 10 is coupled to the negative voltage bus 20 through a regenerative diode 28 and regen current sensor 30. The diode 28 is poled to conduct current from the bus 20 to the upper terminal of armature 10. A second diode 32 is connected between the lower terminal of armature 10 and the positive voltage bus 18 and poled to conduct current from the armature 10 to the bus 18.

In a normal propulsion mode of operation, the contactor 24 is closed so that a positive voltage is applied to the upper terminal of armature 10 causing a current through armature 10 from bus 18 to bus 20, which current can be modulated by the switching device 26. During operation of the motor in an electrical retarding mode, the contactor 24 is opened and the motor operated as a generator with the current passing through the armature in the same direction but being led from the negative bus 20 through the diode 28, the armature 10 and the diode 32. The magnitude of current generated by the armature 10 is a function of the rotational velocity of the armature and also of the magnitude of field flux generated by field 12. More particularly, by controlling the magnitude of current in field 12 and by use of switch 26, the magnitude of regenerative current produced by armature 10 can be regulated so as to produce regenerative current essentially down to zero speed.

The field current in field 12 is controlled by a plurality of switching devices connected in a common H-bridge arrangement of a type well known in the art. The H-bridge arrangement includes a first pair of switching devices 34a and 34b serially connected between bus 18 and bus 20 and a second pair of serially connected switching devices 34c and 34d connected essentially in parallel with the first switching devices. The junction intermediate the pair of switching devices 34a and 34b is connected to a first field terminal F1 and a junction intermediate devices 34c and 34d is connected to a second terminal F2 of winding 12. Each of the devices 34a–34d are bypassed by a respective one of a plurality of diodes 36a–36d. The diodes 36a–36d provide a fly-back current path when the switching devices are switched to a non-conducting state. More particularly, when the motor is operated in the first direction of propulsion, the switches 34a and 34d are operated in a switching mode, such as a pulse width modulated mode, to regulate field current and the diodes 36a–36d provide a current path for the inductive field current when the devices 34a, 34d switch from a conductive to a non-conductive state. Field current sensors 38 and 40 are connected in each of the respective lines between the lower switching devices 34b and 34d and the negative power bus 40. The devices 34 are preferably MOSFET switching devices of a type well known in the art.

The pulse width modulation signals for each of the MOSFET switching devices 34 are provided from a commercially available pulse width modulation signal generating circuit 42 in response to control signals from a microcomputer 44. The microcomputer 44 is programmed to respond to several input signals including the position of an accelerator switch 46 to initiate conduction of the switching devices 34 and the switching device 26 in a manner to regulate motor current to achieve a desired speed of the vehicle. In a conventional fork lift truck, the armature 10 may be connected directly to a drive axle of the truck for driving at least one wheel of the truck. In an on-road vehicle, the armature 10 may be connected to a transmission which in turn is connected to provide driving power to wheels of the vehicle. The transmission may allow different gears to be used to enable a higher top end speed for the vehicle. The microcomputer 44 monitors armature current, field current, vehicle speed and accelerator switch position in order to control the conduction of the switching devices 34 and the switching device 26 to cause the vehicle to operate along a desired motor characteristic. The microcomputer 44 also receives input from a direction switch 48 which selects either forward, reverse or a neutral position for the vehicle. Furthermore, there is typically provided an input from a start switch 50 which may be equivalent to a key switch that controls operation of the contactor 16. In the case of a fork lift truck, this system may also include a seat switch 52 which senses that an operator is seated on the seat and a brake switch 54 which senses application of a brake command. The voltages supplied to microcomputer 44 through the various devices is appropriately conditioned by voltage conditioner or regulator 45.

In a normal propulsion mode, whether in a forward or reverse direction, the direction switch 48 will provide an input to the microcomputer 44 which indicates the proper direction of travel for the associated vehicle. In response, the microcomputer 44 will control the switching devices 34 in such a manner as to initiate current through field 12 in a direction to cause the armature 10 to rotate clockwise or counter clockwise as necessary to cause the vehicle to proceed in a forward or reverse direction. In the inventive system, the microcomputer senses a number of conditions indicating that electrical retarding of the vehicle should be initiated. In particular, the microcomputer 44 senses that the accelerator 46 has been returned to its rest position thereby commanding a zero speed, or that the direction switch has been shifted into a neutral position so that neither a forward nor reverse command is present, or that the brake switch has been actuated. If any one of these events occurs, the microcomputer 44 provides signals to the pulse width modulation circuit 42 to actuate the appropriate switching devices 34 so as to reverse the direction of power applied to the field 12. For example, if the motor had been operating in a forward propulsion mode with switching devices 34a and 34d being modulated to control field current, the switching devices 34a and 34d would be inactivated and the devices 34b and 34c would now receive signals to control the current in field 12 in a reverse direction. In prior art systems, this reversal of the power applied to field 12 did not occur until the motor had slowed to a base speed, normally about half the maximum propulsion speed. At this point the field reversal would cause a loss of power to the motor causing it to momentarily free wheel with a loss of braking torque. Upon reapplication of power to the motor field in a reverse direction, torque would be reapplied thereby causing a perturbation or jerking motion of the vehicle. In order to avoid this problem, the present invention immediately reverses the polarity of voltage applied at field 12 upon sensing of a condition upon which electrical retarding may be utilized. More particularly, the microcomputer 44 senses the above mentioned signals from the accelerator switch 46, direction switch 48 and brake switch 54 to initiate a field reversal so that electrical retarding is immediately present upon sensing of any of those conditions. Concurrently with reversing the field, the system opens the contactor 24 thereby disconnecting the armature 10 from the positive bus 18. The microcomputer 44 controls contactor 24 through control of a contactor actuator 24a of a type well known in the art. With contactor 24 open, current in armature 10 continues in the same direction but is now directed through regenerative diode 28 and diode 32 from the negative power bus 20 to the positive power bus 18. Accordingly, armature current is now supplied to battery 14 and the system operates in a regenerative retarding mode. As the vehicle slows, there comes a time at which the rotational velocity of armature 10 is less than that which will allow armature voltage to exceed the voltage of battery 14 regardless of the magnitude of current in field 12. At this time, microcomputer 44 cyclically gates switch 26 into and out of conduction. When switch 26 conducts, the armature 10 is short-circuited through switch 26 and diode 28. As a result, a substantial current is built-up in armature 10 even through armature voltage is small. When switch 26 is gated out of conduction, the inductive reactance of armature 10 forces current to continue through the armature via diodes 28 and 32. Thus, the motor can be used in a regenerative mode even as motor speed approaches zero by cyclically operating switch 26 to build current in armature 10.

The incorporation of the braking contactor 24 to disconnect the armature from the positive bus 18 and the operation of the H-bridge switching means 34 to immediately reverse the polarity of voltage applied to field 12 upon sensing of a demand for electrical retarding overcomes the problems associated with prior art systems in which a momentary loss of torque occurred during the electrical braking mode.

While the invention has been described in what is presently considered to be a preferred embodiment, various modifications and improvements will become apparent to those skilled in the art. It is intended therefore that the invention not be limited to the presently disclosed embodiment but be interpreted within the full spirit and scope of the appended claims.

What is claimed is:

1. A method of regenerative electrical braking of an electrically propelled vehicle, the vehicle including at least one separately excited direct current (DC) electric traction motor coupled in driving relationship with at least one wheel of the vehicle, the motor having an armature winding coupled via one terminal thereof through a first switching means to a relatively positive terminal of a DC power source and coupled via another terminal thereof through a second switching means to a relatively negative terminal of the DC power source, the motor further including a field winding coupled via an H-bridge switching means to the DC power source, the method comprising the steps of:

sensing a commanded change in an operating mode of the vehicle from a propulsion mode to a non-propulsion mode;

open circuiting the first switch means in response to the step of sensing to disconnect the one motor terminal from the DC power source positive terminal;

operating the H-bridge switching means to reverse the connection of the field winding to the DC power source for reversing field flux developed in the motor whereby the motor armature is effectively connected in a regenerative braking mode for producing electric current in response to continued rotation of the armature caused by rotation of the at least one wheel from continued motion of the vehicle; and modulating the second switching means to effect a build-up of current in the armature winding by cyclical short-circuiting thereof to enable regenerative braking to substantially zero speed of the vehicle.

2. An electric power control system for an electrically propelled vehicle, the vehicle including at least one separately excited DC electric motor having a rotatable armature and a stationary field, the armature being coupled in driving relationship with at least one wheel of the vehicle and both the armature and field being coupled to a DC electric power source, the system comprising:

first switching means serially connected between one terminal of the armature and a relatively positive terminal of the DC power source;

second switching means serially connected between another terminal of the armature and a relatively negative terminal of the DC power source;

a first diode connected between said one terminal of the armature and the relatively negative terminal of the DC power source and poled to conduct current from the negative terminal to said one terminal;

a second diode connected between said another terminal of the armature and the relatively positive terminal of the DC power source and poled to conduct current from said another terminal to said relatively positive terminal;

a plurality of controllable switching devices connected in circuit with the motor field and arranged to form an H-bridge for selectively controlling current through the field in a desired direction for controlling the polarity of flux produced by the field;

control means coupled to said first and second switching means and to said switching devices to control the operation thereof in response to an operator's commands and to selected vehicle operation sensing devices, some of the sensing devices providing transition signals indicative of a transition of vehicle operation from a propulsion mode to a non-propulsion mode, said control means operating said switching devices to reverse current in the field in response to said transition signals to cause the motor to operate in a regenerative mode during coasting of the vehicle.

3. The electric power control system of claim 2 wherein one of said sensing devices comprises means for sensing vehicle accelerator position.

4. The electric power control system of claim 2 wherein one of the sensing devices senses transition of a vehicle direction command to neutral.

5. The electric power control system of claim 2 wherein said control means is operative to open said first and second switching means concurrently with operating said switching devices to reverse field current.

6. The electric power control system of claim 5 wherein said control means is operative to cyclically vary conduction of said second switching means in a manner to increase current in said armature in response to slowing of the vehicle.

* * * * *